(12) United States Patent
Komanek

(10) Patent No.: US 10,523,544 B2
(45) Date of Patent: Dec. 31, 2019

(54) BUS GUARDIAN IN A DATA BUS

(71) Applicant: CONTINENTAL AUTOMOTIVE GMBH, Hannover (DE)

(72) Inventor: Robert Komanek, Regenstauf (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 15/659,238

(22) Filed: Jul. 25, 2017

(65) Prior Publication Data

US 2017/0324631 A1 Nov. 9, 2017

Related U.S. Application Data

(63) Continuation of application No. PCT/EP2015/077780, filed on Nov. 26, 2015.

(30) Foreign Application Priority Data

Jan. 26, 2015 (DE) .......................... 10 2015 201 278

(51) Int. Cl.
*H04L 12/26* (2006.01)
*H04L 12/40* (2006.01)
*G06F 11/07* (2006.01)

(52) U.S. Cl.
CPC ...... *H04L 43/0823* (2013.01); *G06F 11/0745* (2013.01); *H04L 12/40032* (2013.01);
(Continued)

(58) Field of Classification Search
CPC ..... H04L 12/40032; H04L 2012/40215; H04L 43/0823; H04L 43/00; H04L 12/40026;
(Continued)

(56) References Cited

U.S. PATENT DOCUMENTS 7,676,286 B2 3/2010 Disser et al.
2009/0290485 A1* 11/2009 Zinke ................ H04L 12/40006
370/221
(Continued)

FOREIGN PATENT DOCUMENTS

CN 103786664 A 5/2014
DE 10243713 A1 4/2004
(Continued)

OTHER PUBLICATIONS

International Search Report and Written Opinion dated Mar. 9, 2016 from corresponding International Patent Applicatio No. PCT/EP2015/077780.
(Continued)

*Primary Examiner* — Kyaw Z Soe

(57) ABSTRACT

A control system is disclosed, including a first control device, a second control device and a driver component for driving signals on a data bus. The first control device includes a data output which is connected to a data input of the driver component, and a monitoring device for deactivating the data output in the event of a fault. A deactivation signal of the second control device for the driver component is fed to a data input of the first control device, and the first control device is configured to deactivate the data output in the event of an error signal at the data input.

12 Claims, 1 Drawing Sheet

(52) U.S. Cl.
CPC ............... *H04L 12/40169* (2013.01); *H04L 2012/40215* (2013.01)

(58) Field of Classification Search
CPC ....... H04L 12/4135; H04L 2012/40273; H04L 12/40006; H04L 12/40013; G06F 11/0745
See application file for complete search history.

(56) References Cited

U.S. PATENT DOCUMENTS

| | | | | |
|---|---|---|---|---|
| 2009/0327549 | A1* | 12/2009 | Fuehrer | G06F 11/0745 710/107 |
| 2010/0002594 | A1* | 1/2010 | Elend | H04L 12/40026 370/252 |
| 2010/0229046 | A1* | 9/2010 | Fuehrer | G06F 9/546 714/43 |
| 2013/0285445 | A1* | 10/2013 | Melzl | G06F 1/28 307/10.1 |

FOREIGN PATENT DOCUMENTS

| | | |
|---|---|---|
| DE | 102009024095 A1 | 12/2009 |
| DE | 102009005266 A1 | 7/2010 |
| WO | WO2004100455 A1 | 11/2004 |
| WO | WO2006067673 A2 | 6/2006 |
| WO | WO2008010141 A1 | 1/2008 |

OTHER PUBLICATIONS

German Office Action dated Sep. 28, 2015 for corresponding German Patent Application No. 10 2015 201 278.6.
Korean Office Action, dated Mar. 20, 2019, for counterpart KR application 10-2017-7020902.
Chinese Office Action dated Aug. 16, 2019 for corresponding Chinese Patent Application No. 201580074598.1.

* cited by examiner

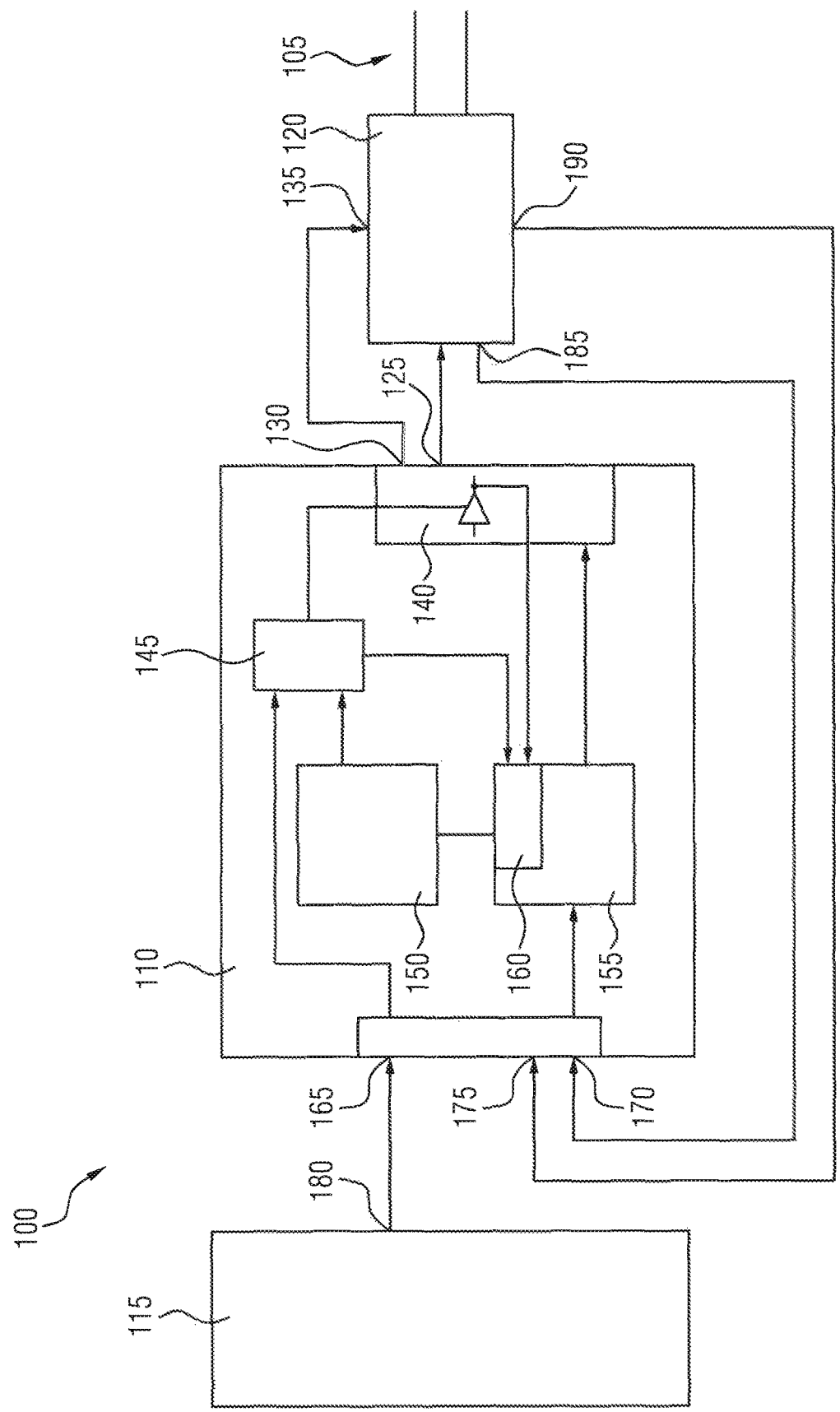

BUS GUARDIAN IN A DATA BUS

CROSS REFERENCE TO RELATED APPLICATIONS

This application claims the benefit of PCT Application PCT/EP2015/077780, filed Nov. 26, 2015, which claims priority to German Application DE 10 2015 201 278.6, filed Jan. 26, 2015. The contents of the above applications are incorporated herein by reference.

FIELD OF INVENTION

The invention relates to a control system. In particular, the invention relates to protecting a control system, which may be connected to a data bus, against a fault state.

BACKGROUND

A control system, for example onboard a motor vehicle, is connected to a data bus via which it can communicate with other control systems or control devices. Some of these control devices or systems can fulfil the control functions which are relevant for the safety of an operating or uninvolved person in the environment. For example, a combustion engine or a braking device can be controlled onboard a motor vehicle. If there is a malfunction in one of the control systems or devices, it must be ensured that via the data bus, no data is transmitted which impair the operation of another control system or device and can thus compromise the safety of a controlled process.

The data bus can comprise, for example, a CAN bus. A control device of the control system is connected to the CAN bus by means of a driver chip. The control device is configured to automatically detect a fault state and to switch off the driver chip in the case of a fault. For this purpose, a dedicated output of the control device is connected to a corresponding enable input of the driver chip. To increase the security, a further control device can be provided which monitors certain operations of the first control device and detects a fault state. If a fault state is detected, the second control device switches the driver chip off via its enable input. This requires a logical combination of the shutdown signals of both control devices. In addition, a driver chip must then be used which has an enable input brought outside.

If the driver chip is switched off, the driver chip usually delivers a fault signal to the first control device. The first control device or the other control device must then usually determine the reason for the shutdown. This can mean a fault in the first control device, a fault in the second control device and a fault in the driver chip. Additionally, connections or combinations of signals can be faulty. Finally, the fault signal itself can also be faulty. In order to correctly allocate the fault, different signal paths between the control devices and the driver chip must therefore be checked. This checking can be elaborate and necessitate that signals are output on the data bus which are only used for determining the fault and are not directed to another control device or system.

SUMMARY

It is the object of the present invention to provide a control system for connecting to a data bus which supports an improved fault analysis.

A control system includes a first control device, a second control device and a driver chip for a data bus. In this context, the first control device includes a data output which is connected to a data input of the driver chip, and a monitoring device for deactivating the data output in case of a fault. A deactivation signal of the second control device for the driver chip is conducted to a data input of the first control device and the first control device is configured to deactivate the data output of the first control device following a fault signal at the second input.

A driver chip may be used which does not have an enable input. The driver chip may have a reduced number of connections so that the driver chip may be designed to be more compact. As a result, the control system may be constructed to be more compact. In addition, production costs may be reduced or an operational reliability of the control system increased due to the reduced number of connections. In particular, the reliability of the shutdown of the driver chip may be improved. Furthermore, there may be a logical combination of shutdown signals of the first and the second control device without providing for this purpose a component or an integrated circuit outside the control devices and the driver chip. As a result, the control system may be constructed in a more simplified manner. The space requirement of the control system or an area needed on a circuit board may be lowered further.

In addition, it may be possible, in a simplified manner, to determine the source of a shutdown. In particular, the first control device may determine, in a simplified manner, whether the shutdown has occurred due to a local decision or due to a sampled signal of the second control device. A shutdown of the driver chip, for example due to a self monitoring of the driver chip, may be determined in a known manner by a fault signal which is provided by the driver chip and which is provided to an input, for example, of the first control device.

In particular, it can be avoided that in the case of a fault state in the control system, signals are output on the data bus which may be interpreted erroneously by a further connected control device or control system as data, particularly as valid data. As a result, the safety of a system which includes the control system may be enhanced as a result. In particular, it can be ensured in an improved manner that in the case of the use of the control system onboard a motor vehicle, that the control system does not impair the control of a process, the control device of which is connected to the data bus, also in the case of a fault. The safety of a person onboard of the motor vehicle or in the area of the motor vehicle may be improved as a result.

In an embodiment, the signal of the monitoring device and the signal at the data input of the first control device are combined with one another by a logic circuit within the first control device. The first control device may be configured to provide such a combination by a corresponding configuration. This configuration may be carried out, for example, during the startup of the first control device. A program expenditure providing for this may be low so that the program may be varied or verified in a simpler manner. The configuration may also be protected against being changed by a process which is carried out after the startup of the first control device.

In this context, the data output may be deactivated by each of the signals independently of one another. In other words, the data output is activated only if neither the monitoring device within the first control device nor the signal of the second control device at the data input of the first control device is opposed to such activation. Deactivation of the data output thus has priority over an activation signal of one of the control devices.

In particular, the data output may be configured to become highly resistive following a deactivation signal. In other words, output drivers of the first control device may be switched off following the deactivation signal. Such output drivers are also known by the designation "tri-state" drivers. Such data drivers may assume three states at a terminal of the first control device brought out externally, namely logical 1, logical 0 and highly resistive. The first two states are provided for conveying data to the driver chip. If the data output terminal is switched to be highly resistive, the signal present at the input of the driver chip will no longer be influenced by the first control device. The driver chip may recognize this state and take a suitable measure. In this case, the driver chip may also detect a predetermined logic level at its input which is usually defined in such a way that the sending of data of the driver chip on the data bus is blocked as immediately as possible.

In a further embodiment, the driver chip may be placed additionally into an energy-saving mode by the first control device. For this purpose, the driver chip includes an enable input which is connected to a further data output of the first control device, so that the driver chip may be controlled by the first control device. The enable input is a control input which is also known as enable input in one embodiment. This blocking corresponds to the opposite of an enabling. The control system may be separated even more efficiently from the data bus by this means. The deactivated state of the driver chip is occasionally also called sleep state. Under certain circumstances, the sleep state may be ended in that the driver chip is addressed or activated with predetermined data via the data bus.

In an embodiment, the further data output is controllable independently of a deactivation of the other data output. The deactivating of the data output may be kept independent of the deactivating of the driver chip by this means. For analysis purposes, particularly within the context of a self test or the determination for which reason or from which source the data output connected to the output driver has been deactivated, this may be advantageous.

In an embodiment, the driver chip includes an enable output, in order to indicate its enable state, the enable output being connected to a further data input of the first control device.

By this means, the first control device may sample the state of the driver chip without effecting a data exchange via the data bus. In particular, the first control device may detect when the driver chip changes its enable state without this having been initiated by one of the control devices. This may include, for example, an entry into an enable state by signaling via the data bus or an exit from the enable state due to a self-diagnosed fault.

BRIEF DESCRIPTION OF THE DRAWING

The example embodiments of the invention will now be described in more detail with reference to the attached FIGURE which represents a diagrammatic representation of a control system.

DETAILED DESCRIPTION

The FIGURE shows a control system 100 for connection to a data bus 105. The control system 100 may be configured to be used onboard a motor vehicle. In this context, the control system 100 may perform any control task, such as engine control or brake control. The data bus 105 may include, for example, a CAN bus. The data bus 105 may be connected to one or more further control devices or control systems, one of which may perform a control task, the wrong execution of which may impair the physical or functional safety of a surrounding system, particularly of the motor vehicle.

The control system 100 includes a first control device 110, a second control device 115 and a driver chip 120. The first control device 110, in particular, may be implemented as programmable microcomputer. In an embodiment, a configurable microcomputer is used which includes functional units which are initially independent of one another and the interactions of which may be configured by predetermined control commands. Such an embodiment is a microcontroller. The elements of the first control device 110 shown in the FIGURE may be integrated with one another, for example as a separately manageable assembly. The integration may include the elements formed on a common semiconductor substrate. In this case, the first control device 10 may be a one-chip microcontroller. The second control device 115 may be an arbitrary control device which, for example, may also be implemented as a programmable microcomputer. Alternatively or additionally, the second control device 115 may be, for example, an application-specific integrated circuit (ASIC) or a field programmable gate array (FPGA). The second control device 115 is designed separately from the first control device 110 and is configured to monitor an operation of the first control device 110. However, the control devices 110 and 115 may be located spatially close to one another in that they are arranged, for example, on the same circuit board, in the same assembly or in the same housing. In an embodiment, the control system 100 is a separately manageable unit which is mounted, for example, onboard a motor vehicle. This may simplify a self test of the control system 100.

Such a redundant monitoring may be encountered, for example, in a safety-relevant controller such as a brake controller onboard a motor vehicle. The driver chip 120 may be separate from the first control device 110 and configured to exchange data with the data bus 105. For this purpose, voltages, currents or other physical signals which are defined on the data bus 105 may be generated or evaluated by the driver chip 120, in particular.

The first control device 110 includes a first data output 125 and, in an embodiment, a second data output 130. The data outputs 125, 130 may be physically accessible as terminals of the first control device 110. The second data output 130 is connected to an enable input 135 of the driver chip 120. Data which are to be output by the first control device 110 to the data bus 105 are transmitted to the driver chip 120 via this connection. The first data output 125 may be deactivated within the first control device 110. The second data output 130 is preferably independent of that. For the deactivation, an output 140, which may be placed into a high-impedance state via an associated signal, may be provided, for example, within the first control device 110. This signal may be provided within the first control device 110 by a logic circuit 145 which is configured to combine at least two signals logically with one another. One of the signals is here provided by an internal monitoring device 150.

The logic circuit 145 may be integrated with another functional block within the first control device 110. The logic circuit 145 may be configured so that the type of logical combination or the signals combined with one another may be selected. The monitoring device 150 is configured to monitor an operation of the first control device 110 internally. For this purpose, a memory protection or a time-controlled monitoring device ("watchdog timer"), for example, may be implemented by the monitoring device 150. In operation of the first control device 110, the monitoring device 150 may be contacted by a microprocessor 155 on which a monitoring program 160 is running.

The first control device 110 also includes a first data input 165 and optionally another second data input 170 or a third data input 175. The first data input 165 is connected outside the first control device 110 to an output 180 of the second control device 115 and internally conducted to the logic circuit 145. The logic circuit 145 is configured to switch off the first data output 125 or the output driver 140, respectively, when at least one of the signals of the first data input 165 or of the monitoring device 150 carries a corresponding fault signal.

The processor 155 may be connected to the second data input 125 or the output driver 140, respectively, in order to be able to output data in the direction of the data bus 105. A so-called CAN peripheral (CAN-Bus Controller) for controlling the sending and receiving of data via the data bus 105 is not shown in the FIGURE, but may also be provided and connected in the normal manner, particularly to the third data input 170 and via the output driver 140 to the first data output 125. If the driver chip 120 receives data from the data bus 105, it forwards this via an output 185 to the second data input 170 of the first control device 110 from where the microprocessor 155 may receive and process the data.

In an optional embodiment, the driver chip 120 is configured to be enabled or blocked. The blocked state is occasionally also called the sleep state. Accordingly, the sleep state may be then called falling or being asleep and leaving the sleep state may be called waking up. Via a corresponding signal at the second data output 130 of the first control device 110, the driver chip 120 may be influenced in its enable state, that is to say sent to sleep or woken up. The driver chip 120 additionally may include an enable output 190 which is connected to the third data input 175 of the first control device 110. Via the enable output 190, the driver chip 120 indicates its enable state. The first control device 110 may sample by this means whether a signal given by the second data output 130 or the enable input 135 has been correctly implemented by the driver chip. In addition, the first control device 110 may sample or determine, via the third data input 175, whether the driver chip 120 changes its enable state for another reason than the signal at the second data output 130. For example, the driver chip 120 may deactivate itself or go to sleep when it discovers a fault, for example during the handling of a data transfer to or from the data bus 105. In addition, the driver chip 120 may be configured to be woken from a sleep state if corresponding signals are directed to it via the data bus 105.

LIST OF REFERENCE DESIGNATIONS

100 Control system
105 Data bus
110 First control device
115 Second control device
120 Driver chip
125 First data output
130 Second data output
135 Enable input
140 Output driver
145 Logic circuit
150 Monitoring device
155 Microprocessor
160 Monitoring program
165 First data input
170 Second data input
175 Third data input
180 Output
185 Output
190 Enable output

The invention claimed is:

1. A control system comprising:
   a first control device;
   a second control device; and
   a driver chip for a data bus;
   wherein the first control device comprises:
      a data output which is connected to a data input of the driver chip; and
      a monitoring device for deactivating the data output in the event of a fault;
   wherein the second control device includes a deactivation signal for the driver chip and conducted to a data input of the first control device,
   wherein the first control device is configured to deactivate the data output following a fault signal at the data input of the first control device, and
   wherein the driver chip comprises an enable input which is separate from data input of the driver chip and which is connected to a further data output of the first control device, so that the driver chip is configured to be selectively blocked by the first control device.

2. The control system as claimed in claim 1, wherein the first control device includes a logic circuit, an output signal of the monitoring device and the deactivation signal at the data input of the first control device are combined with one another by the logic circuit of the first control device.

3. The control system as claimed in claim 2, wherein the data output is deactivatable by each of the output signal of the monitoring device and the deactivation signal at the data input of the first control device independently of one another.

4. The control system as claimed in claim 1, wherein the data output is configured to become a high-resistive output following the deactivation signal.

5. The control system as claimed in claim 1, wherein the further data output is controllable by the first control device independently of a deactivation of the data output.

6. The control system as claimed in claim 1, wherein the driver chip comprises an enable output, a signal on the enable output of the driver chip indicates an enable state of the driver chip, and the enable output is connected to a second further data input of the first control device.

7. The control system as claimed in claim 1, wherein the first control device comprises one of a programmable microcomputer and a microcontroller, and the second control device comprises at least one of a programmable microcomputer, an application specific integrated circuit, and field programmable gate array.

8. A control system comprising:
   a first controller;
   a second controller; and
   a driver chip which is connectable to a data bus;
   wherein the first controller comprises:
      a data output which is connected to a data input of the driver chip; and
      a monitoring device which deactivates the data output in the event of a fault;
   wherein the second controller includes a deactivation signal for the driver chip and conducted to a data input of the first controller, wherein the first controller is configured to deactivate the data output following an occurrence of a fault signal at the data input of the first controller, wherein the driver chip comprises an enable input which is connected to a second data output of the first controller, the second data output being a separate output from the data output of the first controller, such that the driver chip is configured to be selectively disabled by the first controller, and wherein the second data output is controllable by the first controller independently of a deactivation of the data output.

9. The control system of claim 8, wherein the first control device includes a logic circuit, an output signal of the monitoring device and the deactivation signal at the data input of the first control device are combined with one another by the logic circuit of the first control device, wherein the data output is deactivatable by each of the output signal of the monitoring device and the deactivation signal at the data input of the first control device independently of one another.

10. The control system as claimed in claim 8, wherein the data output is configured to become a high-resistive output following the deactivation signal.

11. The control system of claim 8, wherein the driver chip comprises an enable output, a signal on the enable output of the driver chip indicates an enable state of the driver chip, and the enable output is connected to a third input of the first control device.

12. The control system of claim 8, wherein the first control device comprises one of a programmable microcomputer and a microcontroller, and the second control device comprises at least one of a programmable microcomputer, an application specific integrated circuit, and field programmable gate array.

* * * * *